United States Patent
Boittiaux et al.

(10) Patent No.: US 11,654,951 B2
(45) Date of Patent: *May 23, 2023

(54) VEHICLE STEERING WHEEL

(71) Applicant: Autoliv Development AB, Vargarda (SE)

(72) Inventors: Jonathan Boittiaux, Poitiers (FR); Fabrice Moinard, Vouzailles (FR)

(73) Assignee: Autoliv Development AB, Vargarda (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/465,922

(22) Filed: Sep. 3, 2021

(65) Prior Publication Data
US 2021/0394811 A1    Dec. 23, 2021

Related U.S. Application Data

(63) Continuation of application No. 15/774,473, filed as application No. PCT/EP2016/077447 on Nov. 11, 2016, now Pat. No. 11,136,057.

(30) Foreign Application Priority Data

Nov. 11, 2015 (FR) ...................................... 1560778

(51) Int. Cl.
*B62D 1/04*    (2006.01)
*B60R 16/027*    (2006.01)
(Continued)

(52) U.S. Cl.
CPC ............ *B62D 1/046* (2013.01); *B60R 16/027* (2013.01); *B60R 21/01552* (2014.10);
(Continued)

(58) Field of Classification Search
CPC .. B62D 1/046; B62D 1/06; B62D 1/10; B60R 16/027; G01D 5/16; B60N 2/002; H04N 7/183; G06V 40/19
(Continued)

(56) References Cited

U.S. PATENT DOCUMENTS 7,997,612 B2    8/2011   Gulde
8,474,867 B2    7/2013   Nebel
(Continued)

FOREIGN PATENT DOCUMENTS

DE    102010053354 A1    8/2011
GB         779918 A       7/1957
(Continued)

OTHER PUBLICATIONS

International Search Report for PCT/EP2016/077447, ISA/EP, Rijswijk, NL, dated Jan. 24, 2017.
(Continued)

*Primary Examiner* — Lee E Rodak
*Assistant Examiner* — Trung Q Nguyen
(74) *Attorney, Agent, or Firm* — Harness, Dickey & Pierce, P.L.C.; Stephen T. Olson

(57) ABSTRACT

A vehicle steering wheel includes a hoop, a plurality of presence sensors and an outer sheath. The presence sensors are each arranged so as to detect a proximity and/or contact between a user's limb and the hoop. The outer sheath covers the plurality of presence sensors and is stitched with at least one seam that extends around at least part of the hoop. The plurality of presence sensors is mounted on the same support.

12 Claims, 2 Drawing Sheets

(51) Int. Cl.
*G01D 5/16* (2006.01)
*B62D 1/06* (2006.01)
*B60R 21/015* (2006.01)
*B62D 1/10* (2006.01)

(52) U.S. Cl.
CPC .............. *B62D 1/06* (2013.01); *B62D 1/10* (2013.01); *G01D 5/16* (2013.01); *B60Y 2400/308* (2013.01)

(58) Field of Classification Search
USPC ........ 324/500, 200, 219–252, 207.2–207.24, 324/529–530, 750.12, 750.21, 754.17, 324/754.29, 699
See application file for complete search history.

(56) References Cited

U.S. PATENT DOCUMENTS

| | | | |
|---|---|---|---|
| 8,875,597 | B2 | 11/2014 | Groleau et al. |
| 9,139,217 | B2 | 9/2015 | Bertrand et al. |
| 9,352,768 | B2 | 5/2016 | Doursoux et al. |
| 9,988,003 | B2 | 6/2018 | Moinard et al. |
| 2004/0267422 | A1 | 12/2004 | Bossler et al. |
| 2007/0228028 | A1 | 10/2007 | Starck et al. |
| 2011/0240628 | A1* | 10/2011 | Goretti .................. F23Q 7/001 219/270 |
| 2014/0224040 | A1* | 8/2014 | Van'tZelfde ........... B62D 1/046 73/862.381 |
| 2015/0369633 | A1 | 12/2015 | Karasawa et al. |
| 2016/0114826 | A1 | 4/2016 | Moinard et al. |
| 2017/0166156 | A1 | 6/2017 | Li et al. |

FOREIGN PATENT DOCUMENTS

| | | |
|---|---|---|
| KR | 20140026883 A | 3/2014 |
| WO | 2014/123222 A1 | 8/2014 |
| WO | 2017-046137 A1 | 3/2017 |

OTHER PUBLICATIONS

Written Opinion of the ISA for PCT/EP2016/077447, ISA/EP, Rijswijk, NL, dated Jan. 24, 2017.

* cited by examiner

VEHICLE STEERING WHEEL

CROSS-REFERENCE TO RELATED APPLICATIONS

This application is a continuation of U.S. patent application Ser. No. 15/774,473, filed May 8, 2018, which is a National Stage of International Application No. PCT/EP2016/077447, filed on Nov. 11, 2016, which claims priority to French Patent Application FR 1560778, filed on Nov. 11, 2015, the disclosures of which applications are incorporated herein by reference.

FIELD

The present invention relates in general to a vehicle steering wheel mounted on a motor vehicle and equipped with presence sensors to detect whether the driver is holding or has let go of the steering wheel, so as to transmit an alarm, for example, in the latter case.

In the prior art, steering wheels are known with a hoop equipped with such presence sensors, such as that disclosed by document US 2004267422. But this system has the particular drawback of proposing several sensors that are difficult to position on the steering wheel and hold in place during manufacture. Moreover, bearing in mind the fact that these presence sensors must not be visible, they must therefore be arranged beneath the outer surface of the hoop and so must be positioned either beneath a sheath (of leather for example), embedded or even overmolded with a plastics material (such as polyurethane, for example). Consequently, this plurality of presence sensors is a drawback for the manufacture of the steering wheel.

One object of the present invention is to resolve the drawbacks of the above-mentioned document of the prior art and in particular, firstly, to propose a vehicle steering wheel that has several presence sensors, but is of simplified manufacture.

For this, a first aspect of the invention concerns a vehicle steering wheel comprising:
 a hoop,
 a plurality of presence sensors, each one arranged:
  so as to define on the hoop one detection zone among a plurality of discrete detection zones, and
  so as to detect a proximity and/or contact between a user's limb and said detection zone,
 an outer sheath covering the plurality of presence sensors,
characterized in that said plurality of presence sensors is mounted on the same support,
 wherein the support with the presence sensors forms a detection layer comprising the support formed by an electrical insulator such as polyethylene supporting on a first face the presence sensors formed for example with a polyamide yarn covered at least with nickel, and supporting on a second face at least one grounding electrically conductive film or fabric formed, for example with a polyamide yarn coated at least with nickel, and in which the detection layer comprises a grounding electrically conductive film or fabric for a plurality of presence sensors.

In other words, the grounding electrically conductive film or fabric is common, or shared, for a plurality of presence sensors.

The presence sensors and/or grounding conductive film are in the form of a sheet or film and can be made of woven or non-woven fabric. However, the detection layer formed is flexible (it can be wound round the hoop and even deform in order to stretch or compress so as not to be visible once it is covered, for example, by leather). Moreover, the grounding conductive film or fabric (also referred to as a guard or shield), single and common to the sensors, simplifies the construction of the detection layer, limits the number of connections to the vehicle and simplifies the electronics to which it is connected. In fact, one grounding connection suffices for all of the presence sensors. This avoids the need to run a multitude of grounding electrical conductors in the hub, and/or beneath the sheath. Moreover, there is no need for the electronics connected to the grounding conductor to be multiplexed because the same grounding element is used for all of the sensors. The steering wheel and the associated electronics are therefore simpler.

Advantageously, the support comprises one grounding electrically conductive film or fabric.

Advantageously, the outer sheath is stitched with at least one seam that extends around at least part of the hoop.

Advantageously, at least one of said presence sensors is arranged facing at least part of the seam of the outer sheath, so as to define a detection zone that encompasses at least part of said at least one seam and that extends on either side of said at least one seam, in a transverse direction to said at least one seam.

The steering wheel according to the above embodiment (with a sewn outer sheath that covers the hoop) comprises several sensors but these are integral with one and the same support, which simplifies manipulation and holding in place during manufacture. Moreover, one of the presence sensors faces the seam of the outer sheath that runs around the hoop.

Such a seam connects the two longitudinal edges of the outer sheath together, in order to secure the sheath on the hoop. In fact, before fitting onto the steering wheel, the outer sheath is typically a piece of material generally rectangular in shape. This rectangle has two longitudinal edges, the length of which is substantially that of the inner perimeter of the hoop (since the seam is on the inside of the hoop, facing the hub), that are then stitched together, edge-to-edge for example. Furthermore, this rectangle has two lateral edges, the length of which is substantially that of the perimeter of a section of the hoop in a plane containing the axis of a steering column. As the seam is located on the inside of the hoop, the outer sheath is pre-positioned round the outside of the hoop and then folded inwards so that the lateral edges face the inside of the hoop.

Coming back to the presence sensor facing the seam of the outer sheath, it extends along the seam and also on either side thereof and enables detection of a proximity and/or a contact with the detection zone encompassing the seam and running along either of this seam. In other words, it is possible to detect with a single sensor whether the driver is touching the steering wheel on an inner portion of the hoop (a portion facing the hub). This embodiment thus also improves manufacture by simplifying the overall architecture: just one presence sensor is sufficient and enables detection of a proximity and/or a contact on the seam and on either side thereof (in relation to the longitudinal direction of the seam).

In comparison to a steering wheel comprising a presence sensor that surrounds the hoop, with a join zone (where the edges of the sensor meet without touching) arranged at the seam where detection is impossible due to the space between the edges of the presence sensor, the invention offers a detection advantage at the seam, with only one presence sensor. In other words, the invention utilizes the space between two detection zones to position the join zone. This optimizes the coverage of the detection zone.

Advantageously, the presence sensor arranged facing at least part of the seam has at least one edge that is always on the same side of the seam. This sensor can, for example, have a generally rectangular shape. One or two sides of this sensor can be substantially parallel to the seam. This optimizes the cutting plane of the sensor and at the same time of the sensor support while retaining total sensitivity at the seam. As the seam is located on the inside of the hoop, the sensor support is pre-positioned on the inside, the front face or the rear face of the hoop and then folded back so that the side edges face the outside, front or rear of the hoop but not the inside. In other words, the sensor support is positioned inversely or turned by 90° in relation to the outer sheath since the latter closes on the inside the hoop, at the seam.

Advantageously, the sensors are of the capacitive type.

Advantageously, said at least one seam only passes through the outer sheath. This embodiment means that the presence sensor that is facing the seam is not affected.

Another aspect of the invention relates to a vehicle steering wheel comprising:

a hoop, a plurality of presence sensors, each one arranged:

so as to define on the hoop one detection zone among a plurality of discrete detection zones, and so as to detect a proximity and/or a contact between a user's limb and said detection zone, a hub, connected to the hoop by at least one spoke, an outer skin made of a plastics material, covering at least the plurality of presence sensors, characterized in that said plurality of presence sensors is mounted on one support, in which the support with the presence sensors forms a detection layer comprising the support formed by an electrical insulator such as polyethylene supporting on a first face the presence sensors formed for example with a polyamide yarn covered at least with nickel, and supporting on a second face at least one grounding electrically conductive film or fabric formed, for example with a polyamide yarn coated at least with nickel, and in which the detection layer comprises a grounding electrically conductive film or fabric for a plurality of presence sensors.

In other words, the grounding electrically conductive film or fabric is common, or shared, for the plurality of presence sensors.

The presence sensors and/or the grounding conductive film are in the form of a sheet or film and can be made of woven or non-woven materials. However, the detection layer formed is flexible (it can be wound round the hoop and even deform so as to stretch or compress so as to be visible once it is covered, for example, by leather). Moreover, the grounding conductive film or fabric (also referred to as a guard or shield) single and common to the sensors simplifies the construction of the detection layer so as to limit the number of connections to the vehicle and simplifies the electronics to which it is connected. In fact, one grounding connection suffices for all of the presence sensors. This avoids the need to run a multitude of grounding electrical conductors in the hub, and/or beneath the sheath. Moreover, there is no need for the electronics connected to the grounding conductor to be multiplexed because the same grounding element is used for all of the sensors. The steering wheel and the associated electronics are therefore simpler.

Advantageously, the support comprises one grounding electrically conductive film or fabric.

Advantageously, at least one of said presence sensors is arranged around at least part of an inner perimeter of the hoop that is facing the hub, so as to define a detection zone that encompasses at least part of said at least one inner perimeter and that extends on either side of said at least one inner perimeter, in a transverse direction to said at least one inner perimeter.

The steering wheel according to the above embodiment (with a smooth and continuous outer skin, or with no seam around the hoop and that covers the hoop and overmolding or embedding the plurality of presence sensors) comprises several sensors but these are integral with one and the same support, which simplifies manipulation and holding in place during manufacture. Moreover, one of the presence sensors is arranged at the inner perimeter of the hoop (the part facing the hub) and then extends around at least part of this inner perimeter and also on either side, which allows a proximity and/or a contact between a detection zone that encompasses the inner perimeter, and extends on either side of this inner perimeter. In other words, it is possible to detect with a single sensor whether the driver is touching the steering wheel on an inner portion of the hoop (a portion facing the hub). This embodiment thus also improves manufacture by simplifying the overall architecture: just one presence sensor is sufficient and enables detection of a proximity and/or a contact on the inner perimeter and on either side thereof (in relation to the longitudinal direction of the inner perimeter).

Thus, the invention provides a detection for a steering wheel with a sewn sheath or seamless sheath in zones that do not normally have presence detection.

Advantageously, the vehicle steering wheel comprises:

a first presence sensor arranged to detect a proximity and/or a contact between a user's limb and a first detection zone arranged on an inner portion of the hoop, a second presence sensor arranged to detect a proximity and/or a contact between a user's limb and a second detection zone arranged on a first half of an outer portion of the hoop, a third presence sensor arranged to detect a proximity and/or a contact between a user's limb and a third detection zone arranged on a second half of an outer portion of the hoop. The steering wheel according to this embodiment makes it possible to differentiate the user's grip. If the latter touches the steering wheel on an inner portion of the hoop, the first presence sensor will detect it. If the user touches the steering wheel solely with his right hand on the outside of the hoop, one of the second or third presence sensors will detect it. Lastly, if the driver touches the steering wheel solely with his left hand on the outside of the hoop, the other of the second or third presence sensors will detect it. Clearly, the detection can take into account the rotation of the steering wheel in order to distinguish the left from the right.

Advantageously, the vehicle steering wheel comprises at least one spoke to connect the hoop to a hub, and the first presence sensor surrounds said at least one spoke and/or comprises a cutout to surround said at least one spoke, and covers at least two portions of the inner perimeter separated by said at least one spoke.

Advantageously, the first presence sensor covers at least partly each of the portions of the inner perimeter separated by said at least one spoke.

Advantageously, each presence sensor among the plurality of presence sensors is arranged to detect continuously a proximity and/or a contact between a user's limb and its respective detection zone.

Advantageously, the detection layer and/or the support with the presence sensors has an elongated and flat form before being placed around the hoop, with two longitudinal edges and two lateral edges.

Advantageously, the steering wheel hoop substantially forms a torus, obtained by rotating a section of the hoop about a circle of radius R.

Advantageously, the longitudinal edges are of a length that is substantially equal to a perimeter of the circle of radius R.

Advantageously, the lateral edges are of a length that is substantially equal to a perimeter of the section of the hoop (in a section or cut through a plane containing the axis of rotation of the steering wheel, or hub, or steering column).

Advantageously, the detection layer has an elongated form, with two longitudinal edges each connecting two ends lengthwise, and in which the plurality of presence sensors and said at least one grounding electrically conductive film or fabric each has a connection portion, and in which the connection portions are all arranged along the same longitudinal edge. This embodiment allows simplification of the electrical connection of the detection layer, with all of the connection portions on the same side of the detection layer. Moreover, as there is only one grounding film or fabric common to all of the sensors, its connection is easy to make along one longitudinal edge, since the surface of the common grounding film or fabric is necessarily tangent to or common with this longitudinal edge. It is therefore easier to make the connections of the layer of the steering wheel according to the invention with the vehicle's onboard network. A connection portion is a sensor portion, i.e. formed of the same material as that of the sensor, this allows the detection layer not to be made overly thick by using another element.

Advantageously, the connection portions are positioned in a connection zone between the hoop and at least one spoke. Preferably the connection zone is located at the bottom of the steering wheel, alternatively called the six o'clock zone. This makes it possible to optimize the position of the connection zones in relation to the detection zones.

Advantageously, the connection portion of the second sensor and the connection portion of the third sensor are arranged on either side of the first sensor.

Advantageously, the connection portion of the first sensor is arranged between the second sensor and the third sensor.

Advantageously, the vehicle steering wheel comprises at least one spoke connecting the hoop to a hub, with a first lateral edge of said at least one spoke connecting the hoop with a first radius of curvature and a second lateral edge of said at least one spoke connecting the hoop to a second radius of curvature greater than the first radius of curvature, the support and at least one of the presence sensors covers a portion of said at least one spoke, and the support and said at least one of the sensors have a cutout offset towards the first lateral edge, in relation to a width of said at least one spoke. This embodiment facilitates the cutout of the template or flat form of the detection layer, by bringing the cutout of the lateral edge that has the smallest radius of curvature closer. This also facilitates the sheathing of the template on the steering wheel and limits the risk of the formation of creases.

Another aspect of the invention relates to a vehicle steering wheel comprising:
a hoop,
a plurality of presence sensors, each arranged:
so as to define on the hoop a detection zone among a plurality of discrete detection zones, and
so as to detect a proximity and/or a contact between a user's limb and said detection zone,
an outer sheath covering the plurality of presence sensors and stitched with at least one seam that extends around at least part of the hoop, characterized in that said plurality of presence sensors is mounted on the same support, and in that at least one of said presence sensors is arranged facing at least part of the seam of the outer sheath, so as to define a detection zone that encompasses at least part of said at least one seam and that extends from either side of said at least one seam, in a transverse direction to said at least one seam.

The steering wheel according to the above embodiment (with a stitched outer sheath that covers the hoop) comprises several sensors but these are integral with one and the same support, which simplifies manipulation and holding in place during manufacture. Moreover, one of the presence sensors faces the seam of the outer sheath that runs the around the hoop.

Such a seam connects the two longitudinal edges of the outer sheath, in order to secure the sheath on the hoop. In fact, before fitting onto the steering wheel, the outer sheath is typically a piece of material usually rectangular in shape. This rectangle has two longitudinal edges, the length of which is substantially that of the inner perimeter of the hoop (since the seam is on the inside of the hoop, facing the hub), that are then stitched together, edge-to-edge for example. Furthermore, this rectangle has two lateral edges, the length of which is substantially that of the perimeter of a section of the hoop in a plane containing the axis of a steering column.

Coming back to the presence sensor facing the seam of the outer sheath, it extends along the seam and also on either side thereof and enables detection of a proximity and/or a contact with a detection zone encompassing the seam and running along either side of this seam. In other words, it is possible to detect with a single sensor whether the driver is touching the steering wheel on an inner portion of the hoop (a portion facing the hub). This embodiment thus also improves manufacture by simplifying the overall architecture: just one presence sensor is sufficient and enables detection of a proximity and/or a contact on the seam and on either side thereof (in relation to the longitudinal direction of the seam).

In comparison to a steering wheel comprising a presence sensor that surrounds the hoop, with a join zone (where the edges of the sensor meet without touching) arranged at the seam where detection is impossible due to the space between the edges of the presence sensor, the invention offers a detection advantage at the seam, with only one presence sensor. In other words, the invention utilizes the space between two detection zones in order to position the join zone. This optimizes the coverage of the detection zone.

Advantageously, the sensors are of the capacitive type.

Advantageously, said at least one seam only passes through the outer sheath. This embodiment means that the presence sensor that is facing the seam is not affected.

Another aspect of the invention concerns a vehicle steering wheel comprising:
a hoop,
a plurality of presence sensors, each one arranged:
so as to define on the hoop a detection zone among a plurality of discrete detection zones, and
so as to detect a proximity and/or a contact between a user's limb and said detection zone,
a hub, connected to the hoop by at least one spoke,
an outer skin made of a plastic material, covering at least the plurality of presence sensors,
characterized in that said plurality of presence sensors is mounted on one support,
and in that said plurality of presence sensors is arranged around at least part of an inner perimeter of the hoop that is facing the hub, so as to define a detection zone that encompasses at least part of said at least one inner perimeter and that extends on either side of said at least one inner perimeter, in a transverse direction to said at least one inner perimeter.

The steering wheel according to the above embodiment (with a smooth and continuous outer skin, or with no seam around the hoop and that covers the hoop and overmolding or embedding the plurality of presence sensors) comprises several sensors but these are integral with one and the same support, which simplifies manipulation and holding in place during manufacture. Moreover, one of the presence sensors is arranged at the inner perimeter of the hoop (the part facing the hub) and then extends around at least part of this inner perimeter and also on either side, which allows a proximity and/or a contact between a detection zone that encompasses the inner perimeter, and extends on either side of this inner perimeter. In other words, it is possible to detect with a single sensor whether the driver is touching the steering wheel on an inner portion of the hoop (a portion facing the hub). This embodiment thus also improves manufacture by simplifying the overall architecture: just one presence sensor is sufficient and enables detection of a proximity and/or a contact on the inner perimeter and on either side thereof (in relation to the longitudinal direction of the inner perimeter).

Thus, the invention provides a detection for a steering wheel with a sewn sheath or seamless sheath in zones that do not normally have presence detection.

Clearly, all of the above independent aspects can be combined together to obtain a particular embodiment of the invention.

Another aspect of the invention concerns a motor vehicle comprising a steering wheel according to the preceding aspects.

Further features and advantages of the present invention will emerge more clearly from the following detailed description of an embodiment of the invention given by way of non-limiting example and illustrated by the accompanying drawings, in which.

Figure 1:
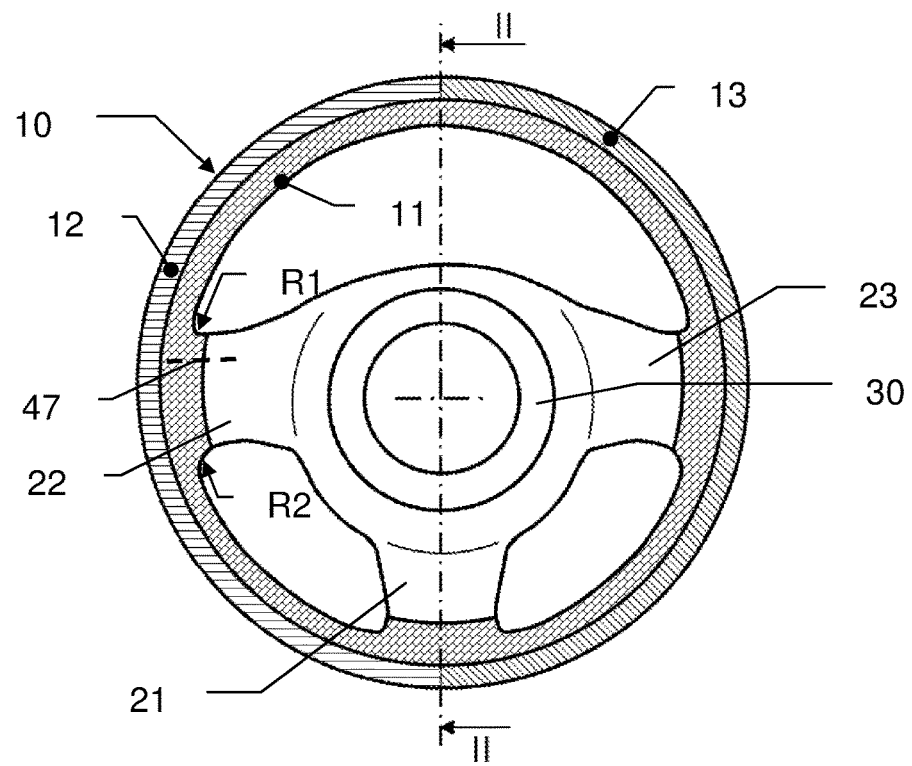
FIG. 1 represents a front view of a vehicle steering wheel according to the present invention, with three detection zones of proximity and/or contact between a user's limb and the hoop.

FIG. 1 represents a vehicle steering wheel comprising a hoop 10, a hub 30, connected to the hoop 10 by three spokes 21, 22, 23. According to the invention, the steering wheel comprises a plurality of presence sensors 41, 42, 43 (visible in FIG. 3 arranged beneath an outer sheath 16 (visible in FIG. 2, and of leather for example).

Figure 2:
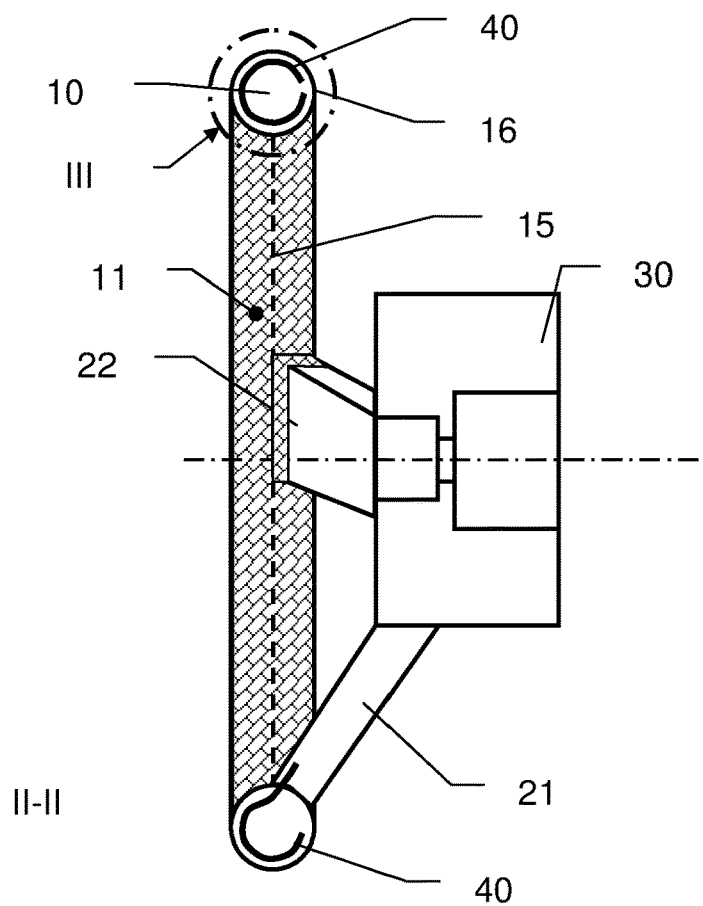
FIG. 2 represents a section of the vehicle steering wheel in FIG. 1 along axis II-II.

During manufacture, the outer sheath 16 is placed on the steering wheel and in particular on the hoop 10, then sewn onto itself with at least one seam 15 that extends around the hoop 10 and is visible in FIG. 2.

Each presence sensor of the plurality of presence sensors 41, 42, 43 defines a detection zone 11, 12 and 13 of proximity and/or contact between a user's limb and the hoop 10. As shown in FIG. 1, the detection zone 11 is located on the inner portion of the hoop 10, i.e. on its portion facing the hub 30. This means that the detection zone 11 encompasses the seam 15 of the outer sheath 16, and also extends either side of the seam 15 to cover the entire inner portion of the hoop 10 facing the hub 30, as shown in FIG. 2.

Figure 3:
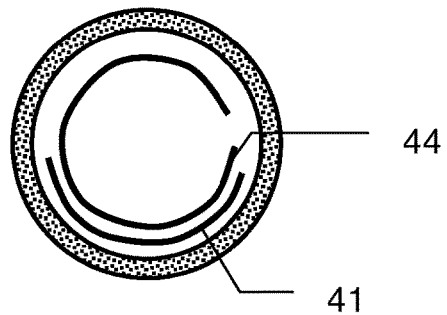
FIG. 3 represents a detail of the section shown in FIG. 2.

FIG. 2 is a section along axis II-II represented in FIG. 1, showing the detection layer 40 that is beneath the outer sheath 16. This detection layer 40 comprises a support on which the presence sensors 41, 42 and 43 are mounted, as shown in FIG. 3 for the presence sensor 41.

FIG. 2 shows on the upper section of the hoop 10 that the detection layer 40 is wound round the hoop 10, with a join that is located at around 3 o'clock, i.e. opposite the driver. This section, surrounded by zone III is shown in further detail in FIG. 3. For a closure at around 3 o'clock, the layer 40 is pre-positioned during its assembly at around 9 o'clock (i.e. on the front face of the steering wheel) then the lateral edges are folded towards the back of the steering wheel, at 3 o'clock. The initial position of the layer 40 can vary as long as the join lies between 9 o'clock and 3 o'clock, i.e. in the top part of FIG. 3 and is not therefore located in the inner area of the hoop.

In other words, the join zone where the longitudinal edges of the detection layer are facing one another is not beneath the seam 15 as is usually the case when elements are sheathed on the hoop of a steering wheel. This join zone is angularly offset, which makes it possible to have only one presence sensor 41 in order to define one detection zone 11, which is continuous. The embodiment according to general knowledge, with a join zone beneath the seam, would necessarily create, beneath the seam, a zone without detection. Note that the edges of the detection layer 40 do not touch, or that there is no electrical contact between these edges.

Lastly, FIG. 2 shows, at the connection point of spoke 21 with the hoop 10, that the detection layer 40 covers part of the spoke 21. Due to the connecting radii between the spokes 21, 22, 23, cutouts can be provided in the detection layer 40 for these spoke portions to be covered by the same template. If, as for the spoke 22, there are two different connecting radii R1 and R2, it is advantageous to provide the cutout on the side of the smallest radius, in order to limit the folds in the detection layer 40 during manufacture. For example, the cutout may be made at line 47 shown in FIG. 1, which is closer to radius R1 than radius R2, in the sense of the width of the spoke 22. Preferably, the cutout is made on a part of the detection layer 40 that is at the back of the steering wheel, on the face opposite the driver.

Figure 4:
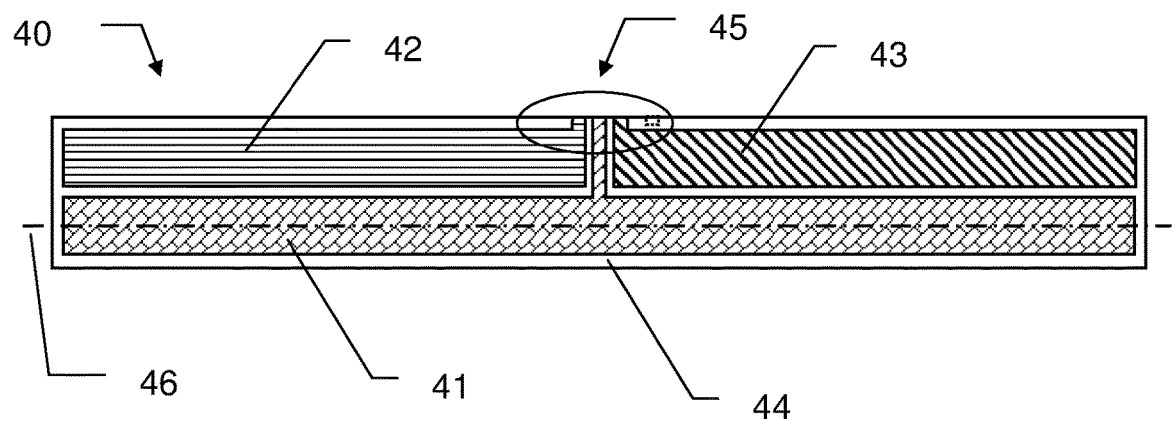
FIG. 4 represents a first embodiment of a detection layer defining the three detection zones in FIG. 1.

FIG. 4 represents a first embodiment of a detection layer 40. This comprises all of the presence sensors 41, 42, 43, a grounding film or fabrics 44, and the support (not visible) arranged between the presence sensors 41, 42, 43, and the grounding film or fabrics 44. Typically, the presence sensors 41, 42, 43, and the grounding film or fabrics 44 are sheets or films or fabrics comprising at least one polyamide yarn covered at least partially with nickel. In other words, the presence sensors 41, 42, 43 are capacitive sensors, with the detection layer 40 forming a sandwich or composite to this effect. The support is therefore an electrical insulator and can be made of foamed polyethylene for example. In this FIG. and FIG. 5, the future position of the seam 15 is represented by the dot-dash line 46. As shown, the sensor 41 has a generally rectangular shape of which the long sides are substantially parallel to the seam 15. Thus the long sides are always on the same side of the seam 15. The cutting plane of the sensor 41 is thus optimized since there is no wastage on cutting the latter. The seam being located on the inside of the hoop, the sensor support is pre-positioned on the inside of the hoop and then folded outwards so that the lateral edges face the outside of the hoop. In other words, the sensor support is positioned inversely in relation to the outer sheath since it closes on the inside of the hoop whereas the sensor support closes on the outside of the hoop The presence sensors 41, 42, 43 and the grounding film or fabrics 44 must therefore be connected electrically, and in zone 45 portions are provided to connect to a vehicle onboard network. In order to simplify assembly, all of the connection portions are arranged on the same edge of the detection layer 40, one of the longitudinal edges, if it has a rectangular shape as is the case here. Note that the shape shown here is a sketch and it must be remembered that the detection layer 40 according to the invention can comprise recesses to surround the spokes 21, 22, 23 of the steering wheel.

In the present case, the connection portion of the presence sensor 41 is arranged between the other two presence sensors 42 and 43. If a connection is envisaged with the onboard network at the bottom spoke 21 (located at 6 o'clock), enabling the presence sensors 42 and 43 to be used in order to detect a presence on the outside left or right of the steering wheel, then the two ends of the detection layer 40 will be arranged at 12 o'clock on the steering wheel. Positioning the connection zone 45 on the longitudinal side opposite the dot-dash line 46 results in this connection zone being positioned on the steering wheel, once the detection layer is sheathed on the steering wheel, above the spoke 21. This simplifies the subsequent connection to the vehicle network because the spoke 21 need not be passed over by a cable bundle in order to connect the detection layer to the hub. Similarly, all of the connections are therefore made at one and the same spoke, which produces a simple cable bundle.

Figure 5:
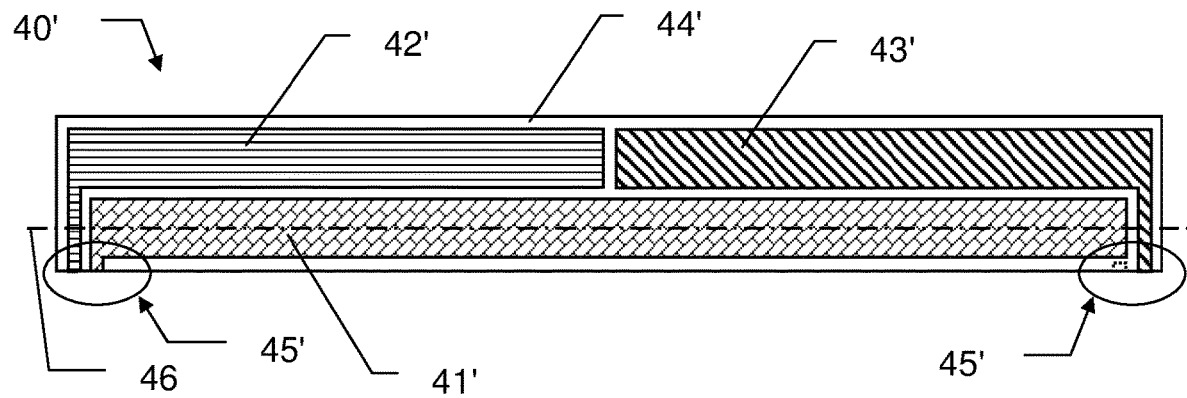
FIG. 5 represents an alternative of the detection layer in FIG. 4.

Alternatively, as shown in FIG. 5, the connection portions can be provided at the ends of a connection layer 40', where the presence sensor 41' is arranged between a connection portion of the presence sensor 42' and a connection portion of the presence sensor 43'. Clearly, there is also a connection portion of the presence sensor 41' and a connection portion of the grounding film or fabrics 44', also at the ends, and always on the same longitudinal side of the connection layer 40'. Positioning the connection zone 45' on the longitudinal side closest to the dot-dash line 46 results in this connection zone on the steering wheel being positioned, once the detection layer is sheathed on the steering wheel, beneath the spoke 21. This requires the spoke 21 to be passed through or surrounded by a cable bundle in order to connect the detection layer to the hub. Here too all of the connections are therefore made at one and the same spoke, which produces a very simple cable bundle.

It will be understood that the various modifications and/or improvements obvious to a person skilled in the art can be made to the different embodiments of the invention described in the present description without departing from the scope of the invention defined by the accompanying claims.

The invention claimed is:

1. A vehicle steering wheel comprising:
   a rim;
   a plurality of presence sensors, each presence sensor arranged on the rim to define a corresponding detection zone among a plurality of discrete detection zones, and to detect proximity and/or contact between a user and the detection zone, and
   an outer sheath covering the plurality of presence sensors, wherein the plurality of presence sensors is mounted on a common support, the common support and the presence sensors forming a detection layer comprising the common support, formed by an electric insulator, and supporting, on a first surface, the presence sensors, and supporting on a second surface a common electrical conductor for the plurality of presence sensors, the common electrical conductor being a common grounding electrical conductor film or fabric, and
   wherein the plurality of presence sensors includes:
   a first presence sensor arranged on the rim to detect at least one of user proximity and user contact at a first detection zone of the rim; and
   a second presence sensor arranged on the rim to detect at least one of user proximity and user contact at a second detection zone of the rim.

2. The vehicle steering wheel of claim 1, wherein the first detection zone is on a right side of the rim and the second detection zone is on a left side of the rim.

3. The vehicle steering wheel of claim 1, further comprising a third presence sensor arranged on the rim to detect at least one of user proximity and user contact at a second detection zone of the rim.

4. The vehicle steering wheel of claim 3, wherein the first detection zone is on a forward facing portion of a left side of the rim, the second detection zone is on a forward facing portion of a right side of the rim, and the third detection zone is on a rearwardly facing portion of the rim.

5. The vehicle steering wheel of claim 3, wherein the first detection zone is on a rearwardly facing portion of a left side of the rim, the second detection zone is on a rearwardly facing portion of a right side of the rim, and the third detection zone is on a forwardly facing portion of the rim.

6. The vehicle steering wheel of claim 1, wherein the detection layer has an elongated form with first and second longitudinal edges.

7. The steering wheel of claim of claim 6, wherein the plurality of presence sensors and the common grounding electrical conductor film or fabric each has a connection portion arranged along one of the first and second longitudinal edges.

8. The vehicle steering wheel of claim 7, wherein each connection portion is positioned in a connection zone.

9. The vehicle steering wheel of claim 8, wherein the connection zone is positioned between the rim and at least one spoke of the steering wheel.

10. The vehicle steering wheel of claim 1, wherein the detection layer has an elongated form with two longitudinal edges extending between two lengthwise ends.

11. The vehicle steering wheel of claim 10, wherein each presence sensor and the common grounding electrical conductor film or fabric has a connection portion, and wherein each connection portion is arranged on a common longitudinal edge of the two longitudinal edges.

12. The vehicle steering wheel of claim 11, wherein a surface of the common grounding electrical conductor film or fabric is tangent to or common with the common longitudinal edge.

\* \* \* \* \*